US005503225A

United States Patent [19]
Withers

[11] Patent Number: 5,503,225
[45] Date of Patent: Apr. 2, 1996

[54] SYSTEM AND METHOD FOR MONITORING THE LOCATION OF FRACTURES IN EARTH FORMATIONS

[75] Inventor: Robert J. Withers, Plano, Tex.

[73] Assignee: Atlantic Richfield Company, Los Angeles, Calif.

[21] Appl. No.: 426,306

[22] Filed: Apr. 21, 1995

[51] Int. Cl.$^6$ .............................. B09B 3/00; E21B 43/26; E21B 42/00
[52] U.S. Cl. .......................... 166/250.1; 166/66; 405/128; 588/260
[58] Field of Search .......................... 166/66, 177, 250.1; 405/128; 588/250, 260

[56] References Cited

U.S. PATENT DOCUMENTS

| | | | |
|---|---|---|---|
| 4,280,200 | 7/1981 | Silverman | 166/250.1 X |
| 4,442,895 | 4/1984 | Lagus et al. | 166/250.1 |
| 4,624,309 | 11/1986 | Schnatzmeyer | 166/66 |
| 4,775,009 | 10/1988 | Wittrisch et al. | 166/66 X |
| 4,879,695 | 11/1989 | Meadows | 166/66 X |
| 4,942,929 | 7/1990 | Malachosky et al. | 175/66 |
| 5,181,565 | 1/1993 | Czernichow | 166/66 |
| 5,226,749 | 7/1993 | Perkins | 405/128 |
| 5,265,680 | 11/1993 | Withers et al. | 166/380 |
| 5,322,126 | 7/1994 | Scott, III | 166/250.1 X |
| 5,387,737 | 2/1995 | Schmidt et al. | 588/250 |
| 5,405,224 | 4/1995 | Aubert et al. | 405/128 |

OTHER PUBLICATIONS

"The Application of High Frequency Seismic Monitoring Method for the Mapping of Grout Injections", E. L. Majer, The International Journal of Rock Mechanics, Mining Science and Geomechanics, vol. 26, Nos. 3 and 4, pp. 249–256, 1986.

"Active and Passive Imaging of Hydraulic Fractures", P. B. Willis Geophysis, Jul. 1992.

Primary Examiner—George A. Suchfield
Attorney, Agent, or Firm—Drude Faulconer

[57] ABSTRACT

A system and method for the real-time monitoring of the location (e.g. vertical extent) of a fracture within a waste disposal formation as that fracture is being formed. Acoustical-energy sensors (e.g. geophones) are isolated within the annulus of the well through which the waste material is injected into the formation. This eliminates the need for expensive, dedicated monitor wells while protecting the sensors from the abrasive effects of the injected waste material.

19 Claims, 2 Drawing Sheets

SYSTEM AND METHOD FOR MONITORING THE LOCATION OF FRACTURES IN EARTH FORMATIONS

DESCRIPTION

1. Technical Field

The present invention relates to a system and method for monitoring the location and extent of a fracture(s) in an earth formation and in one of its aspects relates to a system and method for real-time monitoring of the location (e.g. vertical extent) of a fracture within a formation as the fracture is being formed by positioning a plurality of acoustical energy sensors within the well annulus of the well which is being used to inject the fracturing fluid into the formation.

2. Background Art

In the production of hydrocarbons or the like from subterranean formations, it is common to "hydraulically fracture" a producing formation to increase its permeability, hence the productivity from the formation. In a typical hydraulic fracturing operation, a fracturing fluid (e.g. a liquid such as a gel) is injected under pressure into the formation through an injection well. This fluid may carry entrained, particulate material such as sand or gravel (commonly called "props") which is deposited in the fracture as the fracture is formed to prop or hold the fracture open after the fracturing pressure is relaxed.

In the last few years, hydraulic fracturing has become an important tool not only in the production of hydrocarbons but also in the disposing of unwanted waste materials into subterranean formations. That is, certain waste materials, e.g. drill cuttings or the like from well drilling operations, may be disposed of in certain earth formations by mixing the cuttings into a slurry which, in turn, is then injected into a designated subterranean formation; e.g. see U.S. Pat. Nos. 4,942,929 and 5,387,737. The waste slurry acts as the fracturing fluid in that it fractures the formation as it is injected and deposits the solid wastes similarly as props are deposited in a fractured formation.

One very important consideration in disposing of wastes in this manner, especially if the wastes include any hazardous material, is the ecological effect that the disposed material may have on the environment. That is, it is important that the wastes, once deposited in a formation, do not leach or migrate out of that formation into another formation such as a aquifer or the like from which fluids, e.g. water, may be produced, thereby bringing the waste back to the surface as a contaminant. Therefore, the formations which are to be used as disposal zones need to be carefully selected based on several important characteristics.

For a good discussion of the characteristics which are important or desirable in disposal formations, see copending, commonly-assigned U.S. Patent applications Ser. No. 07/910,381, filed Jul. 8, 1992, now U.S. Pat. No. 5,226,749. As disclosed therein, the formation should not only be capable of being hydraulically-fractured by a slurry of the waste material to provide a permeable zone but should also be bounded by at least an upper and preferably a lower formation zone or stratum which have higher, in situ compressive stresses so that substantially all of the hydraulic fracturing will be confined to the disposal zone.

Unfortunately, formations having all of these desired characteristics are not always available in the areas where the disposal is to take place. That is, a zone may be available which is capable of being fractured to hold large amounts of injected waste material but this zone may also lie in close proximity below a known aquifer with no or only a relatively thin, relatively impermeable layer or strata therebetween. Further, this zone may also contain a fault or the like which could provide a channel through which waste material might escape from the disposal zone.

In such formations, it is vital to continuously monitor the fracture as it is being formed (especially the vertical extent of the fracture) to insure that the fracture does not extend beyond the proposed disposal zone through the overburden or into a fault whereby the injected waste material might flow through the extended fracture into and contaminate the aquifer. In fact, it is reasonable to assume that such monitoring will be required by governmental agencies in the near future when subterranean formations are used as waste disposal zones.

Until recently, the monitoring of the location and the size of a hydraulic fracture(s) (i.e. fracture length, height, width, and rate of growth) at any specific time during a fracturing operation had to be based on calculations using complex mathematical models which, in turn, were complied from a set of predetermined, pre-fracture characteristics of the formation to be fractured. Due to practical considerations (e.g. most subterranean formations are inhomogeneous) and the accuracy of the data used, the real-time location of a fracture may vary substantially from the position predicted by a particular model.

Recently, several techniques have been proposed for the real-time monitoring of a fracture as it is being formed in a formation. For example, in an article entitled "Active and Passive Imaging of Hydraulic Fractures", by P. B. Willis, GEOPHYSICS: The Leading Edge of Exploration, July, 1992, there is a system described for monitoring the growth of hydraulic fractures wherein the seismic events created within the formation during the fracturing operation are detected and measured by geophones positioned within one or more instrumented monitor wells. These measured signals are later processed and analyzed to produce the fracture profile within the formation.

In another article entitled "The Application of High Frequency Seismic Monitoring Methods for the Mapping of Grout Injections" by E. L. Majer, THE INTERNATIONAL JOURNAL OF ROCK MECHANICS, MINING SCIENCE AND GEOMECHANICS, Vol. 26, Nos. 3 and 4, pps. 249–256, 1989, a real-time monitoring system is disclosed wherein digital data at sample rates greater than 50,000 samples per second were used to monitor a laboratory scale fracture generation. This system is proposed for use in determining the real-time extent and location of hydraulic fractures, particularly, but not limited to, those fractures formed by the injection of fluids through an injection well during waste disposal.

Still another system proposed for monitoring the location and extent of a fracture as it is being formed is disclosed and claimed by the present inventor's co-pending, commonly-assigned U.S. Patent application Ser. No. 08/196,621, filed Feb. 14, 1995 wherein a plurality of sensors, e.g. geophones, are positioned within an injection well and/or spaced monitor wells and are adapted to receive distinct, acoustical signals which are generated by a series of individual "microearthquakes" which, in turn, sequentially occur in a formation as a hydraulic fracture grows or propagates outward from and vertically along the wellbore of the injection well.

The present invention provides a further method and system for real-time monitoring of a fracture wherein the sensors are positioned in the annulus of the injection well where they are protected from the abrasive effects of the injected waste material during the fracturing operation.

SUMMARY OF THE INVENTION

The present invention provides a system and method for the real-time monitoring of the location (e.g. vertical extent) of a fracture within a waste disposal formation or zone as the fracture is being formed. In the present invention, the acoustical sensors are isolated within the annulus of the injection well, i.e. the well through which the waste material is injected into the formation which eliminates the need for any separate, spaced monitor wells. Accordingly, the costs of drilling and completing expensive, dedicated monitor wells is eliminated and no existing production wells have to be shut in during the fracturing and disposal operation, thereby significantly reducing the overall costs of the disposal operation.

Further, by isolating the sensors in the annulus of the injection well, the sensors are not exposed to the fracturing fluid (i.e. waste material) as the fluid is injected under pressure into the formation. This is especially important where the waste fluid contains solid, particulate material such as drill cuttings or the like since this particulate material acts as an abrasive which can quickly damage or completely destroy the sensors if the sensors are exposed to the injected waste material (i.e. positioned within the flowpath of the waste material). Further, even if the sensors are positioned within the wellbore but below the injection zone, the transmission cable on which they are suspended is exposed to the erosive effects of the waste material. Accordingly, it is critical that the sensors and the transmission cable survive and remain functional in the well for the prolonged period of the disposal operation (e.g. from weeks to several months) since if the sensors or the cable becomes inoperable, real-time monitoring of the fracture is no longer possible.

More specifically, the present method and system is comprised of an injection well which is completed through a subterranean formation which is to serve as a "disposal zone" for waste materials, e.g. drill cuttings, etc. Ideally, the disposal zone is one which is capable of being hydraulically fractured and is one which has an overlying layer of a relatively impermeable formation which, in turn, has higher, in situ compressive stresses than those of the disposal zone. These higher stresses inhibit the growth of the fracture which, in turn, tends to confine the fracture to the disposal zone.

A string of tubing is lowered into the wellbore of injection well and carries a packer which is set in the well annulus which is formed between the wellbore to isolate the annulus from the disposal zone. A plurality of acoustical sensors are positioned within the isolated well annulus above the packer when in their operable positions. The sensors (e.g. geophones) may be attached to the lower end of the tubing or suspended on a transmission cable from the surface. The sensors are spaced from each other at relatively short intervals along the tubing. The sensors detect acoustical energy created by a fracture and generate a respective signal representative thereof which, in turn, is transmitted through a transmission cable to the surface for processing.

In operation, the tubing is lowered into the injection wellbore and the packer is set to isolate the well annulus from the formation. The sensors may be attached to the tubing and ran into the well with the tubing or they may be lowered within the well annulus from the surface. Where the sensors comprise geophones or accelerometers, they are preferably attached to the tubing using a pad of an acoustic-dampening material and are acoustically-coupled to the wellbore through direct contact between the sensors and/or tubing and the wellbore. Where hydrophones or the like are used, the isolated annulus is filled with a liquid (e.g. water) to acoustically-couple the sensors to the wellbore.

With the sensors in place, a fracturing fluid, e.g. waste material, is pumped down the tubing and out into disposal zone. The fracturing of the formation creates a series of discrete, localized micro-earthquakes which are detected and measured by the acoustical sensors located within the isolated annulus of the injection well.

Signals which are representative of this measured acoustical energy is transmitted to the surface where they can be processed in accordance with known seismic and/or earthquake monitoring methodology to determine the location of the fracture. By monitoring the real-time progression of fracture as it is being formed, any unexpected or undesired extension of the fracture is promptly detected and if such advance threatens to exceed the desired boundaries of disposal zone, the injection of the waste material can be halted without any substantial encroachment of the waste material into the overlying strata.

BRIEF DESCRIPTION OF THE DRAWINGS

The actual construction, operation, and apparent advantages of the present invention will be better understood by referring to the drawings which are not necessarily to scale and in which like numerals identify like parts and in which.

BEST KNOWN MODE FOR CARRYING OUT THE INVENTION

Figure 1:
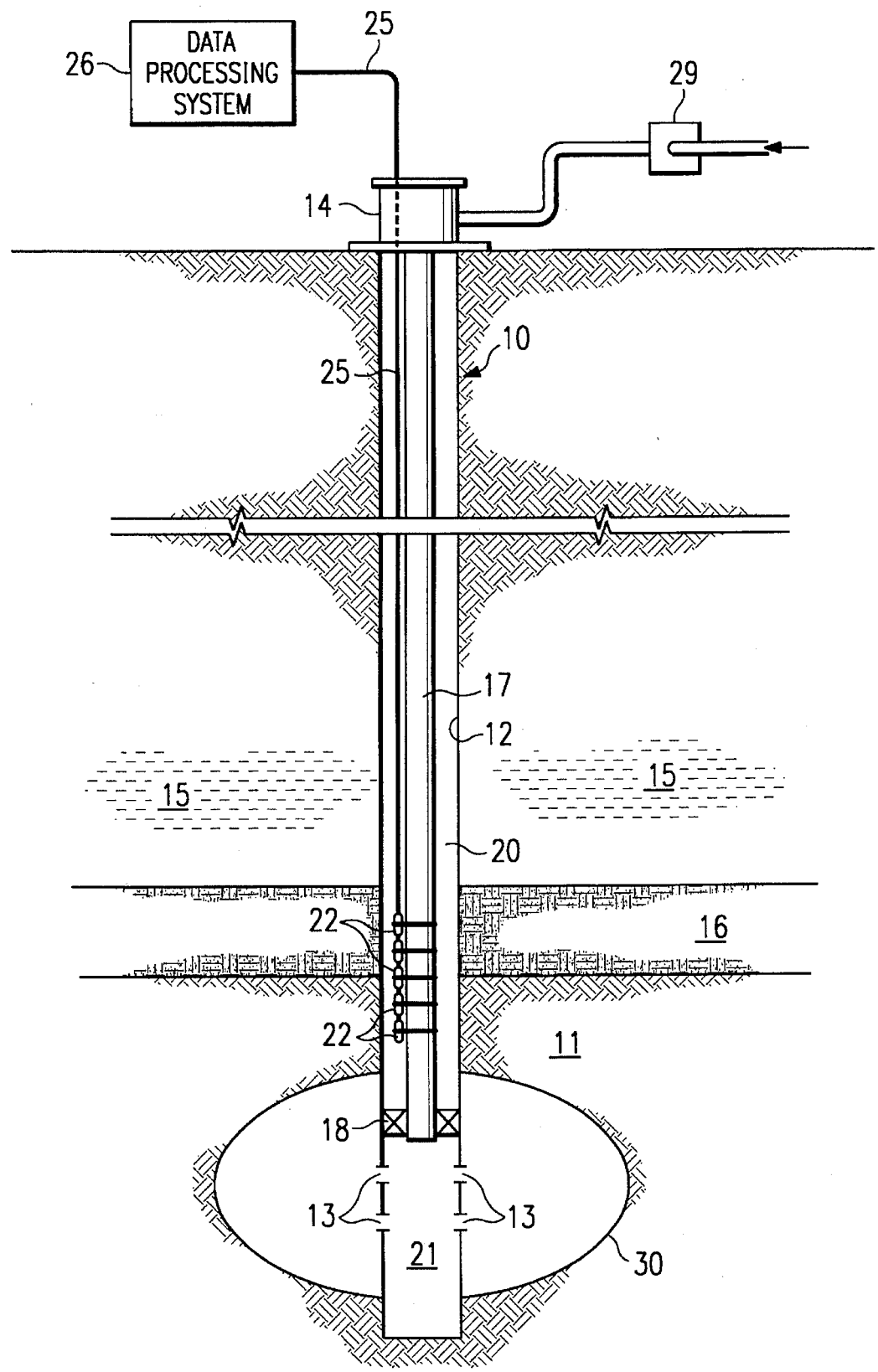
FIG. 1 is an elevational view, partly in section, illustrating an injection well for disposing of waste material into a subterranean formation having a plurality of acoustic sensors positioned therein in accordance with the present invention.
Figure 2:
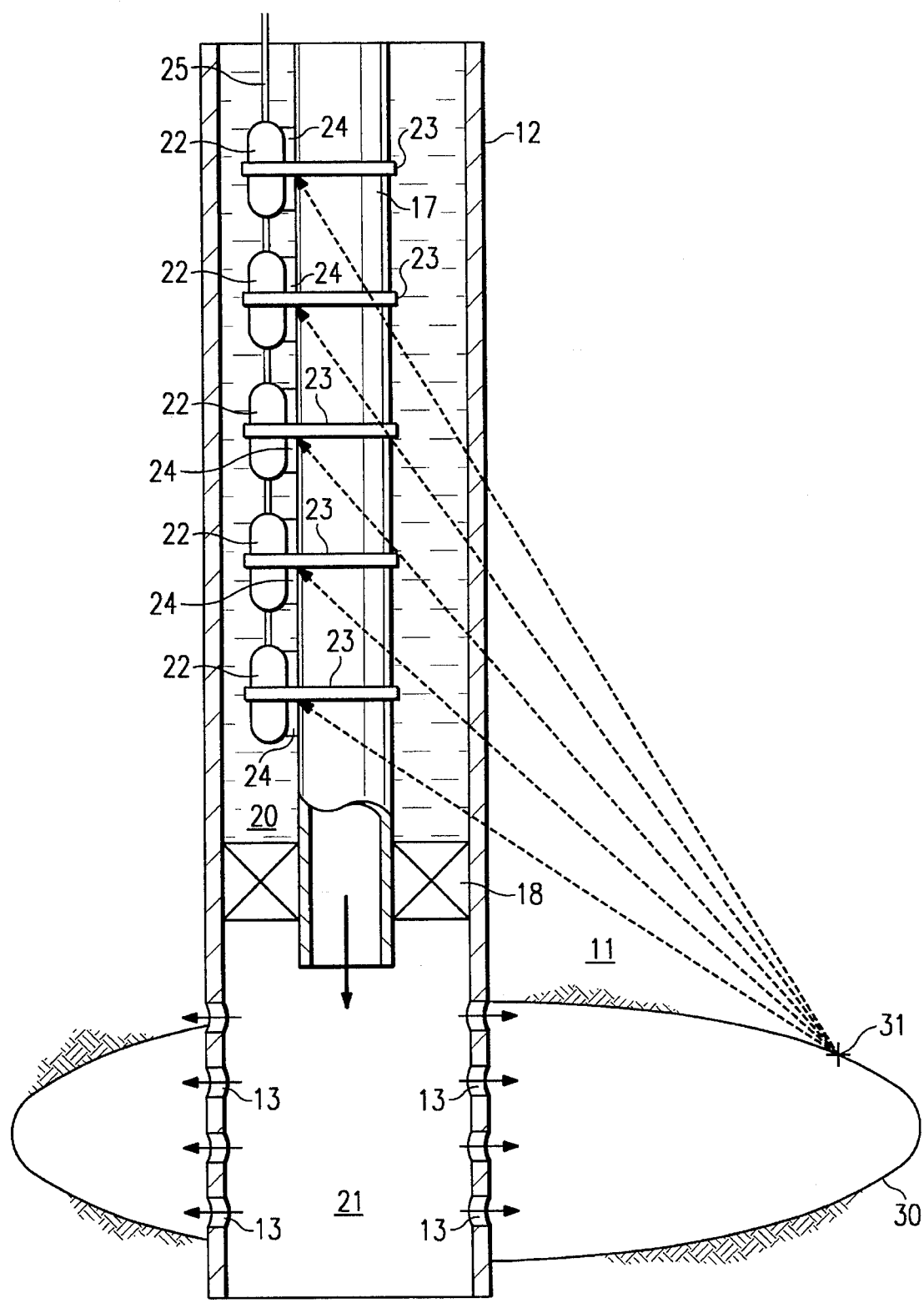
FIG. 2 is an enlarged view of the lower end of the injection well of FIG. 1.

Referring more particularly to the drawings, FIGS. 1 and 2 disclose an injection well 10 which has been drilled and completed through a subterranean formation 11 (hereinafter "disposal zone") which, in turn, is to be used in disposing of waste materials (e.g. oily solutions, drill cuttings, etc.). As shown, injection well 10 is cased with well casing 12 which extends from a conventional wellhead 14 at the surface through disposal zone 11 and includes perforations 13 which lie adjacent to disposal zone 11. Of course, casing 12 may terminate above zone 11 with zone 11 then being completed "open hole", as will be understood by those skilled in the art.

Ideally, disposal zone 11 lies in a formation which is capable of being hydraulically fractured and is one which is separated from overlying aquifiers 15 or the like by a layer of a relatively impermeable formation 16 (e.g. shale). That is, formation 16 has a greater in situ stress than does zone 11 which aids in preventing any hydraulically-induced fractures in zone 11 from extending upward and breaking into and through formation 16 and/or aquifier 15.

A string of tubing 17 is lowered into the wellbore of injection well 10 and terminates near or at perforations 13 in casing 12. Tubing 17 carries a packer 18 which isolates the injection zone 21 from the well annulus 20 which is formed between casing 12 and tubing 17 above packer 18. A plurality of acoustic-energy sensors 22 are lowered into the wellbore wherein they lie within well annulus 20 above packer 18 when in an operable position within injection well 10. Typically, the sensors (e.g. 40–50 in number) will spaced at relatively short intervals (15 feet ) and will extend for a substantial distance along tubing 17 (e.g. 750 feet).

Sensors 22 may be selected from any appropriate acoustic-energy sensing devices (e.g. geophones, hydrophones, accelerometers, etc.) which generate a signal in response to received acoustical energy and then transmit the generated signal on for recording or further processing. For example, a typical sensor 22 may be a hydrophone (e.g. Model "AQ11" hydrophone, commercially-available from Benthos, Houston, Tex.) . Where hydrophones comprises sensors 22, annulus 20 above packer 18 is filled with a liquid (e.g. water) to acoustically-couple the sensors 22 to casing 13.

Another typical sensor 22 may be a geophone unit (not shown) which, in turn, is comprised of three orthogonally-arranged detectors (e.g. 30 Hz broad band type detector such as is commercially-available as a type SM-11 from SENSOR, Houston, Tex.) wherein the detectors are oriented to provide one vertical and two horizontal energy-sensing and signal-transmitting channels. This type of geophone may be attached to the lower end of tubing 17 by any appropriate means, e.g. straps 23 (FIG. 2) and may be lowered with the tubing. It is preferred that each geophone 22 be acoustically isolated from tubing 17 by a pad 24 or sleeve or the like of an energy absorbing or damping material (e.g. foam or spongelike rubber).

Where sensors 22 are attached to tubing 17, the normal flexure in the long string of tubing will provide the necessary acoustically-coupling between the sensors and the casing and hence, the formations behind the casing. That is, due to its own weight, tubing 17 will have a S-curve configuration along its length whereby sensors 22 and/or the tubing 17, itself, will be come into physical contact with casing 12 at several spaced points. This is especially true where the wellbore of well 10 is deviated or inclined. Further, in some instances, the portion of annulus 20 in which sensors 22 lie may be filled with a solid-forming material (e.g. cement) to acoustically-couple the sensors to the casing.

The signals generated by each of the sensors 22 (be they geophones, hydrophones, accelerometers, etc. ) in response to acoustical energy are transmitted through respective channels in transmission cable 25 to data receiving and processing system 26 on the surface.

In operation, injection well 10 is completed and tubing 17 is lowered into the wellbore. Sensors 22 may be attached to tubing 17 and lowered therewith or may be lowered on transmission cable 25. Packer 18 is set to isolate injection zone 21 from well annulus 20. If sensors 22 are not acoustically-coupled to casing 12 by the normal flexure of tubing 17, annulus 20 will be filled with cement or the like or with a liquid (e.g. water) to acoustically-couple the sensors 22 to casing 12. Pump 29 pumps a waste material (e.g. slurry of spent drill cuttings or the like) down through tubing 17 and out through perforations 13 into disposal zone 11. As will be understood by those skilled in the art, the injected waste material is, in effect, a fracturing fluid which will initiate and extent a fracture 30 within zone 11 as the waste material is deposited therein.

As is known, there is significant seismic activity associated with a typical hydraulic fracturing operation such as that involved in waste disposal. This activity results from the way it is believed that a fracture "grows" (i.e. is extended into a formation). That is, fluid is pumped and builds up into the fracture until the in situ stress is overcomed at which time, the formation further "fractures" to thereby extend the fracture a further distance (i.e. vertically and/or horizontally ) into the formation.

This results in a series of relatively small, sequential extensions or "jumps" (i.e. shocks), each of which causes a "micro-earthquake". As these discrete, localized micro-earthquakes occur during the growth of the fracture (both laterally and vertically), the amplitude of the seismic or acoustical energy (i.e. compressional or "P" waves and/or shear or "S" waves ) generated by each occurrence will typically be significant enough to be detected at locations (i.e. sensors 22) which are remote from the origination point (e.g. 31 in FIG. 2).

Accordingly, by sensing and recording the P and S waves in conjunction with their respective arrival times at at various depths (i.e. at each of the spaced sensors 22), these respective acoustical signals can be processed in accordance with known seismic and/or earthquake monitoring methodology to determine the position of the micro-earthquakes (e.g. 31 in FIG. 2); hence, the geometry of the fracture 30 and its location. For a more complete description of one method for processing the signals from sensors 22 for the real-time determination of the location of fracture 30, see the above-mentioned U.S. Patent application filed by the present inventor.

It can be seen that by monitoring the progression of fracture 30 through sensors 22 as it is being formed in disposal zone 11, any vertical advance of the fracture towards or into the overburden (i.e. impermeable strata 16 or an aquifier or the like) is promptly detected and if such advance threatens to exceed the desired boundaries of disposal zone 11, the injection of waste material can be stopped without any substantial encroachment of waste material into the overlying strata.

By placing sensors 22 in annulus 20 and isolating them from injection zone 21, neither the sensors nor the transmission cable is exposed to the erosive and abrasive waste material as the material is pumped down tubing 17 and into the disposal zone 11. This drastically reduces the possibility of damage to the sensors and/or cable thereby significantly extending the operational lives thereof. Further, by placing the sensors within the injection well, the need for any separate monitor wells is eliminated.

What is claimed is:

1. A method for determining the location of a hydraulic fracture within a subterranean formation, said method comprising:

completing the wellbore of an injection well from the surface into said formation;

positioning a string of tubing within said injection well to form an annulus between said tubing and said wellbore, said tubing extending from said surface to a point adjacent said formation;

isolating said annulus from said formation;

positioning at least one acoustical-energy sensor within said isolated annulus;

injecting a fracturing fluid down said tubing and into said formation to form a fracture in said formation; and detecting at said at least one acoustical-energy sensor the acoustical energy which is generated by said fracture as said fracture is being formed.

2. The method of claim 1 wherein said at least one acoustical-energy sensor comprises:

a plurality of acoustical-energy sensors spaced from each other within said isolated annulus.

3. The method of claim 2 wherein each of said plurality of acoustical-energy sensors is attached to and is spaced along said tubing.

4. The method of claim 3 wherein each of said plurality of acoustical-energy sensors is acoustically-dampened from said casing.

5. The method of claim 2 including:

filling said annulus with liquid to acoustically couple said acoustical-energy sensors to said tubing.

6. The method of claim 2 including:

transmitting signals representative of said detected acoustical energy from each of said plurality of acoustical-energy sensors to the surface for processing.

7. The method of claim 6 wherein each of said plurality of acoustical-energy sensors comprises:

a geophone.

8. The method of claim 6 wherein each of said plurality of acoustical-energy sensors comprises:

a hydrophone.

9. The method of claim 6 wherein each of said plurality of acoustical-energy sensors comprises:

an accelerometer.

10. The method of claim 1 wherein said step of isolating said annulus comprises:

placing a packer between said tubing and said wellbore.

11. The method of claim 1 wherein said fracturing fluid comprises:

waste material to be disposed of in said formation.

12. A system for locating a hydraulic fracture within in a subterranean formation, said system comprising:

an injection wellbore completed into said formation;

a string of tubing positioned within said wellbore to thereby form an annulus between said tubing and said wellbore, said tubing extending from the surface to said formation;

a packer carried by said tubing for isolating said annulus from said formation;

at least one acoustical-energy sensor means in said annulus above said packer for detecting acoustical energy generated by the hydraulic fracturing of said formation.

13. The system of claim 12 wherein said at least one acoustical-energy sensor means comprises:

a plurality of acoustical-energy sensors spaced from each other within said isolated annulus.

14. The system of claim 13 wherein each of said plurality of acoustical-energy sensors comprises:

a geophone.

15. The system of claim 13 wherein each of said plurality of acoustical-energy sensors comprises:

a hydrophone.

16. The system of claim 13 wherein each of said plurality of acoustical-energy sensors comprises:

an accelerometer.

17. The system of claim 13 including:

means for attaching each of said plurality of acoustical-energy sensors to said tubing; and means for acoustically-dampening each of said plurality of acoustical-energy sensors with respect to said tubing.

18. The system of claim 13 including:

liquid filling said annulus to acoustically couple said acoustical-energy sensors to said tubing.

19. The system of claim 13 including:

means for transmitting signals representative of said detected acoustical energy from each of said plurality of acoustical-energy sensors to the surface for processing.

* * * * *